United States Patent
McCallister et al.

[11] Patent Number: 6,141,389
[45] Date of Patent: Oct. 31, 2000

[54] DIGITAL TUNER

[75] Inventors: Ronald D. McCallister; Bradley Paul Badke, both of Chandler, Ariz.

[73] Assignee: Sicom, Inc., Scottsdale, Ariz.

[21] Appl. No.: 09/350,485

[22] Filed: Jul. 9, 1999

[51] Int. Cl.[7] .................................................. H04L 27/04
[52] U.S. Cl. ........................... 375/295; 375/296; 375/298
[58] Field of Search ...................... 375/295, 259, 375/296, 298; 332/102, 103

[56] References Cited

U.S. PATENT DOCUMENTS

| | | | |
|---|---|---|---|
| 4,626,803 | 12/1986 | Holm | 332/9 |
| 5,351,016 | 9/1994 | Dent | 332/103 |
| 5,412,352 | 5/1995 | Graham | 332/103 |
| 5,512,865 | 4/1996 | Fague | 332/103 |
| 5,534,828 | 7/1996 | Okada et al. | 332/103 |
| 5,757,858 | 5/1998 | Black et al. | 375/295 |
| 5,781,076 | 7/1998 | Iwamatsu et al. | 332/103 |
| 5,783,974 | 7/1998 | Koslov et al. | 332/103 |

OTHER PUBLICATIONS

IBM Microelectroinics "SiGe DAC Functional Description–" May 5, 1998.

*Primary Examiner*—Stephen Chin
*Assistant Examiner*—Dac V. Ha
*Attorney, Agent, or Firm*—Lowell W. Gresham; Jordan M. Meschkow; Meschow & Gresham, P.L.C.

[57] ABSTRACT

A digital communications modulator (10) includes a low speed IC (12) which performs encoding, symbol generation, pulse shaping, interpolation, linearization, and small amounts of frequency tuning. A complex, baseband digital communications signal (34) is output from the low speed IC (12) as a plurality of parallel streams of digital words. In a digital tuner 14 which includes a high speed IC (20), these parallel streams are digitally combined and digitally up-converted to an IF digital data stream (68) that may have a center frequency many times the baud rate. The high speed IC (20) also converts the digital stream to a broadband analog signal (40). The broadband analog signal (40) is processed through an analog band pass filter (42) that removes spectral images, reduces quantization errors, and limits the bandwidth approximately to the baud rate.

9 Claims, 5 Drawing Sheets

82

| MULTIPLEXER SECTION SEQUENCING WITH L=48 | | | | | | | |
|---|---|---|---|---|---|---|---|
| CLOCK COUNT | DIGITAL WORD | CLOCK COUNT | DIGITAL WORD | CLOCK COUNT | DIGITAL WORD | CLOCK COUNT | DIGITAL WORD |
| 1 | $I_0$ | 13 | $I_1$ | 25 | $I_2$ | 37 | $I_3$ |
| 2 | $Q_0$ | 14 | $Q_1$ | 26 | $Q_2$ | 38 | $Q_3$ |
| 3 | $-I_0$ | 15 | $-I_1$ | 27 | $-I_2$ | 39 | $-I_3$ |
| 4 | $-Q_0$ | 16 | $-Q_1$ | 28 | $-Q_2$ | 40 | $-Q_3$ |
| 5 | $I_0$ | 17 | $I_1$ | 29 | $I_2$ | 41 | $I_3$ |
| 6 | $Q_0$ | 18 | $Q_1$ | 30 | $Q_2$ | 42 | $Q_3$ |
| 7 | $-I_0$ | 19 | $-I_1$ | 31 | $-I_2$ | 43 | $-I_3$ |
| 8 | $-Q_0$ | 20 | $-Q_1$ | 32 | $-Q_2$ | 44 | $-Q_3$ |
| 9 | $I_0$ | 21 | $I_1$ | 33 | $I_2$ | 45 | $I_3$ |
| 10 | $Q_0$ | 22 | $Q_1$ | 34 | $Q_2$ | 46 | $Q_3$ |
| 11 | $-I_0$ | 23 | $-I_1$ | 35 | $-I_2$ | 47 | $-I_3$ |
| 12 | $-Q_0$ | 24 | $-Q_1$ | 36 | $-Q_2$ | 48 | $-Q_3$ |

| MULTIPLEXER SECTION SEQUENCING WITH L=28 | | | | | | | |
|---|---|---|---|---|---|---|---|
| CLOCK COUNT | DIGITAL WORD | CLOCK COUNT | DIGITAL WORD | CLOCK COUNT | DIGITAL WORD | CLOCK COUNT | DIGITAL WORD |
| 1 | $I_0$ | 8 | $-Q_1$ | 15 | $-I_2$ | 22 | $Q_3$ |
| 2 | $Q_0$ | 9 | $I_1$ | 16 | $-Q_2$ | 23 | $-I_3$ |
| 3 | $-I_0$ | 10 | $Q_1$ | 17 | $I_2$ | 24 | $-Q_3$ |
| 4 | $-Q_0$ | 11 | $-I_1$ | 18 | $Q_2$ | 25 | $I_3$ |
| 5 | $I_0$ | 12 | $-Q_1$ | 19 | $-I_2$ | 26 | $Q_3$ |
| 6 | $Q_0$ | 13 | $I_1$ | 20 | $-Q_2$ | 27 | $-I_3$ |
| 7 | $-I_0$ | 14 | $Q_1$ | 21 | $I_2$ | 28 | $-Q_3$ |

FIG. 5

DIGITAL TUNER

TECHNICAL FIELD OF THE INVENTION

This invention relates generally to the field of digital tuners. More specifically, the present invention relates to a digital tuner that is useful in digitally up-converting a complex, baseband digital communication signal to an intermediate frequency.

BACKGROUND OF THE INVENTION

In the field of digital communications, and particularly RF and broadband digital communications, modulators are required to operate at increasingly higher baud rates while complying with increasingly stringent spectral occupancy restraints. While data is converted into an analog form before being transmitted, a tremendous amount of digital processing is typically applied to the data before the data are actually converted into an analog form. This processing includes encoding, symbol generation, and filtering through sophisticated digital filters. The processing functions subsequent to symbol generation typically operate upon complex digital signals and therefore utilize processing resources to handle both in-phase and quadrature components of the complex signals. Typically, the digital processing requirements are met by sophisticated digital integrated circuits having many hundreds of thousands of logic gates.

Digital integrated circuits of this sophistication are desirably implemented using a complementary semiconductor process, such as CMOS. This type of semiconductor process achieves reliable results with sufficiently low power consumption so that the large number of needed logic gates can be combined on a common semiconductor substrate at low cost. Unfortunately, this type of semiconductor has an undesirably slow maximum operating speed when used as a digital modulator operating at the increased baud rates which are becoming popular. In order to compensate for slow maximum operating speed limitations, digital modulators often include on-chip processing resources for parallel processing.

Eventually, however, digital samples generated by such an integrated circuit are converted into an analog form for transmission. For high speed communications, the conversion process often requires many samples, which are generated by such an integrated circuit during each clock cycle of the circuit while operating near its maximum operating speed, to be combined together into a single stream and converted into a complex analog signal having in-phase and quadrature components. Moreover, for RF and wide-band communication systems, mixing functions are performed to tune the digital communication signal to a desired frequency band for transmission.

The combining and mixing functions have been the source of many problems in conventional digital communication modulators. One conventional technique for performing the combining and mixing functions multiplexes separate low speed, parallel in-phase data streams into a single high speed data stream and converts this high speed stream into an in-phase analog signal. The in-phase processing circuits are essentially duplicated for quadrature data streams. The resulting two in-quadrature analog signals are then up-converted using well-known mixing techniques. This technique is desirable because it is a relatively low power and inexpensive way to generate an RE transmission signal from parallel low speed data streams.

Unfortunately, this technique suffers from errors which are common in analog signal processing. In particular, the separate in-phase and quadrature analog signals are separately converted and amplified and are therefore susceptible to amplitude and phase imbalances. In addition, offsets and drifting over time and temperature plague this technique. Moreover, leakage from local oscillators used to generate IF signals is often difficult to adequately remove. Together these analog signal processing errors lead to distortions which make the transmitted signal fail to meet spectral occupancy restraints and which increase bit error rate.

Digital processing techniques have been devised to avoid many of the errors which plague the analog technique for performing the combining and mixing functions. The digital processing techniques digitally combine and mix the separate low speed, parallel data streams to achieve a digital IF signal, which is then converted to analog. One such digital technique digitally processes parallel low speed data streams through a high speed interpolator to synthesize a high speed version of the parallel low speed streams. However, the high speed interpolator is a complicated circuit requiring a large number of logic gates, causing it to consume an undesirably large amount of power.

Another such digital technique uses a direct digital synthesizer to generate a high speed digital, complex exponential signal having sine and cosine components. This high speed complex signal is then digitally mixed with the baseband data signal represented by the parallel low speed data streams using a digital complex multiplier. However, the direct digital synthesizer and complex multiplier are complicated circuits requiring a large number of logic gates and an undesirably large power consumption.

These high power consumption techniques make them unsuitable for many applications, such as battery powered devices. Moreover, while low speed, high complexity components and high speed, low complexity components are routinely and reliably manufactured inexpensively, high speed, high complexity components are often extremely expensive. Accordingly, the conventional digital techniques are impractical for mass market applications.

Increasingly stringent spectral occupancy regulations worsen the problems suffered by the conventional combining and mixing techniques. In order for the digital techniques to improve upon the errors suffered by the analog techniques, a sufficient number of bits of precision must be processed to achieve a low enough quantization error so that an improvement will result. Unfortunately, the conventional digital combining and mixing techniques achieve additional bits of precision by increasing the component complication and exacerbating already undesirable power consumption characteristics.

SUMMARY OF THE INVENTION

Accordingly, it is an advantage of the present invention that an improved digital tuner is provided.

Another advantage is that a digital tuner is provided which is suitable for digitally up-converting a complex, baseband digital communication signal characterized by a plurality of relatively low speed data streams.

Another advantage is that a high speed digital tuner is provided which digitally performs combining and mixing functions using sufficiently fewer logic gates than used by previous high speed digital tuners so that an improved power consumption characteristic results.

Another advantage is that a digital tuner is provided which digitally generates an IF signal in the range of 150–600 MHz.

The above and other advantages of the present invention are carried out in one form by a digital tuner that includes a latch for receiving a plurality of digital words during each of a succession of temporal intervals. The tuner also includes a multiplexing section having an input coupled to the latch to receive the plurality of digital words. The multiplexing section has an output which provides the digital words and the digital words negated. A digital-to-analog (D/A) converter has an input coupled to the multiplexing section output. In addition, a control section couples to the multiplexing section so that, during the intervals, the plurality of digital words is routed to the D/A converter interspersed with the negated digital words.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a table which defines a first example of how digital words may be sequenced through a multiplexing section of the digital tuner;

FIG. 5 shows a table which defines a second example of how digital words may be sequenced through the multiplexing section of the digital tuner;

DETAILED DESCRIPTION OF THE PREFERRED EMBODIMENTS

Figure 1:
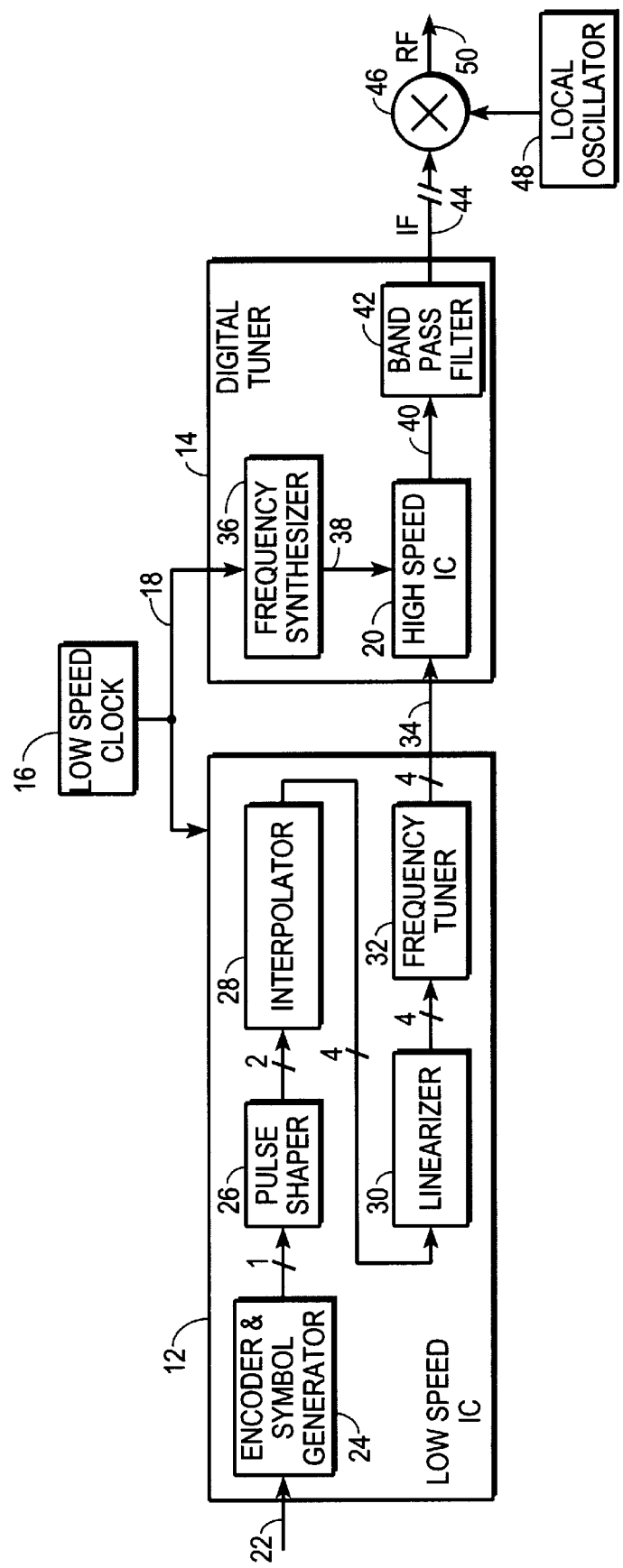
FIG. 1 shows a block diagram of a digital communications modulator which includes a digital tuner configured in accordance with the teaching of the present invention.

FIG. 1 shows a block diagram of a digital communications modulator 10 which includes a low speed integrated circuit (IC) 12 driving a digital tuner 14. Low speed IC 12 and digital tuner 14 each have inputs coupled to a low speed clock 16. No particular oscillation frequency is required of a low speed clock signal 18 generated by low speed clock 16, other than a frequency less than that of a below-described high speed clock. By way of example, low speed clock 18 could exhibit an oscillation frequency of around 50 MHz.

Low speed IC 12 is a monolithic device in which numerous circuits are formed on a common semiconductor substrate. Low speed IC 12 need not be manufactured using any particular semiconductor processing technique. However, IC 12 is desirably manufactured using a semiconductor processing technique characterized by low power consumption and/or a high degree of integration which accommodates a vast multiplicity of logic gates on a common substrate. In the preferred embodiment, IC 12 is a complementary metal oxide semiconductor (CMOS) device. IC 12 is characterized as a low speed device herein only to distinguish it from a high speed IC 20 which is included in digital tuner 14.

Low speed IC 12 includes numerous components which process data supplied to modulator 10 for transmission to a demodulator (not shown). The data are supplied at an input 22. In an encoder and symbol generator 24, the data are encoded in accordance with block and/or convolutional encoding techniques known to those skilled in the art, and chunks of the encoded data are converted into complex symbols. Each chunk of data may include any number "n" of bits, with n=2 bits (QPSK), n=4 bits (16-QAM), n=6 bits and n=8 bits being currently popular. Each complex symbol defines coordinates of a point in a complex constellation of $2^n$ points, wherein each point has in-phase (I) and quadrature (Q) components. In a typical application, each component is expressed by a digital word having 6–12 bits of precision.

For each chunk of data, a complex symbol having I and Q components is passed from encoder and symbol generator 24 to a pulse shaper 26. Pulse shaper 26 desirably implements a raised cosine, Nyquist, root Nyquist or other suitable pulse shaping filter. In wireless communications, pulse shaper 26 is desirable because it spreads the energy of each unit baud interval's phase point pulse over a number of unit baud intervals in a manner that permits recovery in a demodulator. This spreading of the pulse in time reduces the frequency spectrum required to transmit the pulse, thereby allowing modulator 10 to comply with spectral occupancy constraints. In a typical application, pulse shaper 26 may generate two complex samples for each complex symbol received.

The pulse shaped streams from pulse shaper 26 may be routed to an interpolator 28. For each pulse shaped stream, interpolator 28 synthesizes one or more data streams having values appropriate for the baud. In the preferred embodiment, interpolator 28 is implemented so that $R_{baud} = K \cdot R_{ls.sample}/256$; where $R_{baud}$ is the baud rate, $R_{ls.sample}$ is the sample rate as defined by low speed clock 18, and K is an externally programmable constant in the range of 1–64. In other words, the sample rate $R_{sample}$ defined by low speed clock 18 may remain constant while the baud rate varies in proportion to the constant K. In the preferred embodiment, when the constant K equals a maximum value of 64, the baud rate $R_{baud}$ is one-fourth the sample rate $R_{sample}$, and interpolator 28 generates four complex samples for each complex symbol generated by encoder and symbol generator 24.

The interpolated data streams output from interpolator 28 may be routed to a linearizer 30. Linearizer 30 desirably includes individual linearizer circuits for each interpolated data stream. Linearizer 30 compensates for non-linearities in the transfer function of RF power amplifiers (not shown). Non-linearities represent amplifier transfer characteristics in which the amplifier output is not precisely proportional to its input. The types of RF power amplifiers which are desirable and practical to use in digital communications modulators may not possess ideal linear transfer characteristics. Non-linearities in the transfer function would, if not compensated, worsen spectral regrowth so that spectral occupancy constraints are violated. The compensation imposed by linearizer 30 distorts the signal so that when amplified by the actual non-linear transfer function of an RF power amplifier, the result is more nearly true linear amplification.

The linearized data streams output from linearizer 30 may be routed to a frequency tuner 32. Tuner 32 performs a multiplication operation to frequency shift the communications signal. However, due to the low frequency limitations of low speed clock 18, tuner 32 can typically only fine-tune the communications signal by sub-low-speed-clock frequency intervals. Due to this fractional low-speed-clock interval frequency shift, the output of frequency tuner 32 is still considered to be a complex, baseband digital communications signal herein. This baseband signal is presented at an output 34 of low speed IC 12 as a plurality of parallel data streams which, in the preferred embodiment, has four complex digital word pairs per cycle of low speed clock 18.

The baseband signal is routed from low speed IC 12 to high speed IC 20 of digital tuner 14. Low speed clock 18 serves as a reference for an analog frequency synthesizer 36 of digital tuner 14. Frequency synthesizer 36 generates a high speed clock 38 which is synchronized to low speed clock 18 and routed to high speed IC 20. By way of example, high speed clock 38 could exhibit an oscillation frequency in the range of 6–50 times the frequency of low speed clock 18, or around 300–2500 MHz when low speed clock 18 exhibits a frequency of around 50 MHz.

Generally, high speed IC 20 combines the parallel data streams which collectively form complex baseband digital communication signal 34, digitally up-converts baseband signal 34 to an IF frequency several times that of low speed clock 18, and converts the digital up-converted IF signal into a broadband analog signal 40. High speed IC 20 is discussed in detail below. Broadband analog signal 40 is then processed through an analog band pass filter 42 having a passband roughly equivalent to the baud rate and centered at the IF frequency. This passband is a fraction, desirably less than one-half and more desirably less than one-fourth, of the frequency of high speed clock 38. Band pass filter 42 substantially eliminates spectral images and other spectral energy residing outside the small passband, smoothes the waveform, and attenuates quantization errors. Band pass filter 42 outputs an IF analog signal 44, which also serves as the output from digital tuner 14.

In the preferred embodiment, frequency synthesizer 36 is configured in cooperation with low speed clock 16 and the value of the constant K programmed into interpolator 28 so that IF analog signal 44 has a bandwidth approximately equal to the baud rate but centered in the 150–600 MHz range. Up-conversion to the 150–600 MHz range is advantageous because signals in this frequency range are compatible with the ubiquitous and relatively inexpensive coaxial cable used in the cable TV industry. Accordingly, IF analog signal 44 may be easily and inexpensively transported substantial distances over coaxial cable by adding only the analog RF amplification and termination needed to drive the coaxial cable.

In addition, an analog IF signal in the 150–600 MHz range can be further up-converted to an RF analog signal 50 in the 1–30 GHz range in a single mixing operation, denoted by a mixer 46 and a local oscillator 48, while having spectral images sufficiently separated in frequency so as to be easily removed. A filter for removing the spectral images is omitted from FIG. 1. Likewise, a digital-to-analog conversion process carried out in high speed IC 20 imposes a SINC transfer function on analog IF signal 44, and an inverse SINC filter (not shown) may desirably be included downstream of digital tuner 14 to compensate for this distortion.

Figure 2:
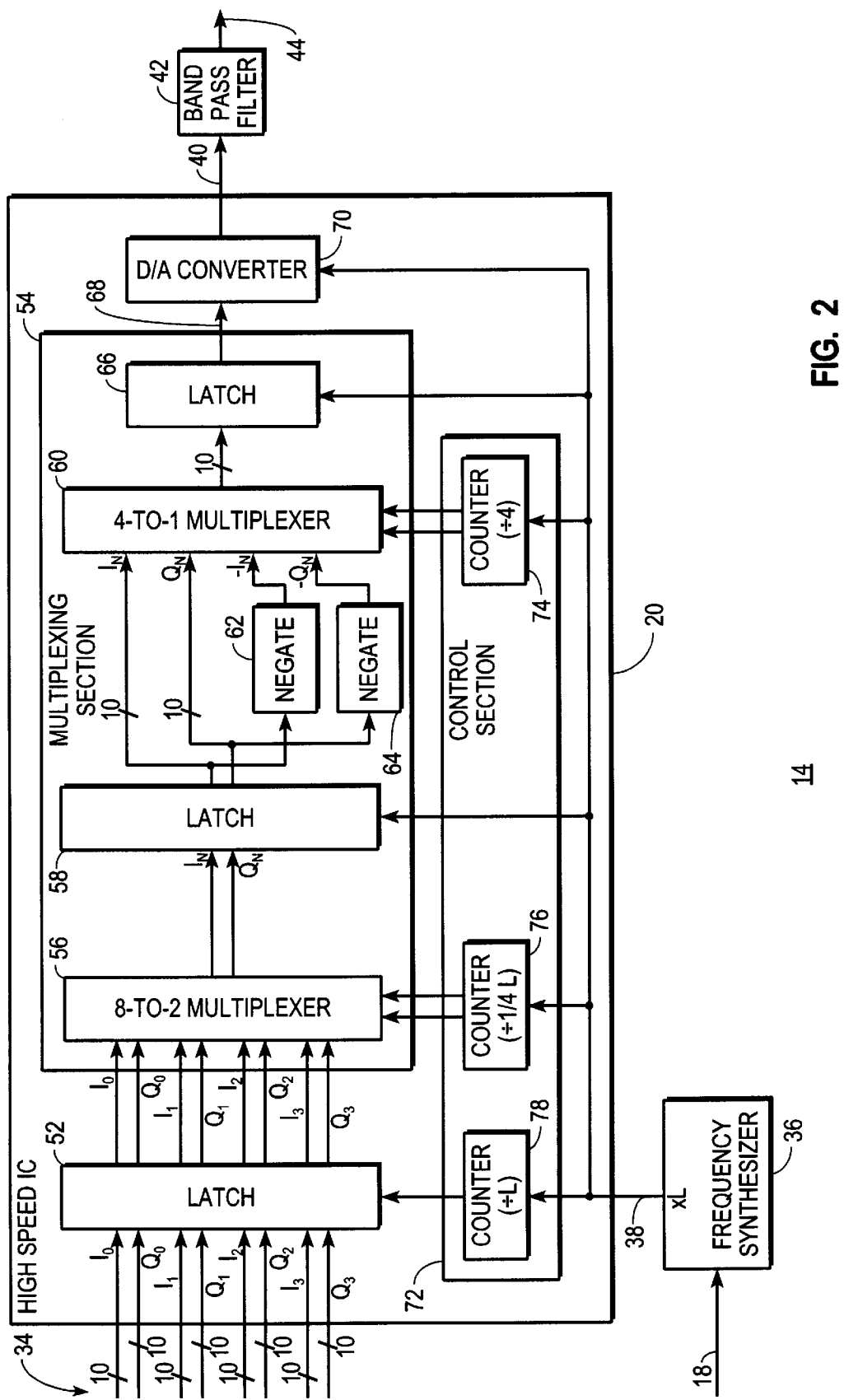
FIG. 2 shows a block diagram of a first embodiment of the digital tuner.

FIG. 2 shows a block diagram of a first embodiment of digital tuner 14. Digital tuner 14 includes high speed IC 20, frequency synthesizer 36 and band pass filter 42. Frequency synthesizer 36 and band pass filter 42 are conventional, relatively inexpensive analog components. High speed IC 20 is a monolithic device in which only a few circuits, compared to the number of circuits on low speed IC 12 (FIG. 1), are formed on a common semiconductor substrate. While high speed IC 20 need not be manufactured using any particular semiconductor processing technique, IC 20 is manufactured using a semiconductor processing technique that is capable of operating at clock speeds of up to 2500 MHz or more in the preferred embodiment. In the preferred embodiment, IC 20 is a silicon—germanium (SiGe) device. IC 20 is characterized as a high speed device herein only to distinguish it from a low speed IC 12 (FIG. 1).

For the particular embodiment depicted in FIG. 2, complex baseband digital communication signal 34 is configured as a stream of eight, ten-bit digital words which are received substantially in parallel during each of successive temporal intervals defined by cycles of low speed clock 18. The eight digital words are configured as four complex pairs of real (I) and imaginary (Q) components, denoted as $I_0$, $Q_0$, $I_1$, $Q_1$, $I_2$, $Q_2$, $I_3$, and $Q_3$. Baseband signal 34 is routed to an input of an eighty-bit latch 52 located on high speed IC 20. An output of latch 52 conveys baseband signal 34 to a multiplexing section 54 of high speed IC 20, and particularly to inputs of an eight-to-two multiplexer 56.

Multiplexer 56 multiplexes eighty input bits, arranged as four complex pairs of digital words, each of which pairs has two, ten-bit in-quadrature components, into twenty output bits, arranged as a complex pair having two, ten-bit components. The two, ten-bit outputs of multiplexer 56 couple to respective, ten-bit inputs of a latch 58. Two ten-bit outputs of latch 58 couple to respective ten-bit inputs of a four-to-one multiplexer 60 and to respective ten-bit negation circuits 62 and 64. Outputs of negation circuits 62 and 64 respectively couple to two other ten-bit inputs of multiplexer 60. A single ten-bit output of multiplexer 60 couples to an input of a ten-bit latch 66, and a ten-bit output of latch 66 provides the output for multiplexing section 54.

The output from multiplexing section 54 includes the various ten-bit digital words presented in complex baseband digital communication signal 34 and those digital words negated. These digital words and negated digital words are interspersed in a manner discussed below. This output forms a digital IF signal stream 68. Digital IF signal stream 68 feeds a digital-to-analog (D/A) converter 70 for conversion into broadband analog signal 40, which is passed to band pass filter 42.

Frequency synthesizer 36 generates high speed clock 38 to exhibit a frequency "L" times greater than low speed clock 18. As discussed above, low speed clock 18 is proportional to the baud through the equation $R_{baud} = K \cdot R_{ls.sample}/256$. Accordingly, high speed clock 38 is proportional to the baud through the equation $R_{baud} = K \cdot R_{hs.sample}/(L \cdot 256)$, where $R_{baud}$ is the baud rate, $R_{hs.sample}$ is the sample rate as defined by high speed clock 38, and K is an externally programmable constant for interpolator 28 (FIG. 1) in the range of 1–64, and L is the factor by which the low speed clock 18 is multiplied to generate high speed clock 38.

High speed clock 38 is routed onto high speed IC 20 and used to clock latch 58, latch 66 and D/A converter 70 after receiving appropriate buffering (not shown). A control section 72 of high speed IC 20 includes a modulo-4 counter 74, a modulo-L/4 counter 76, and a modulo-L counter 78, all driven by high speed clock 38. Two output bits from each of counters 74 and 76 respectively couple to selection inputs of multiplexers 60 and 56. A divide-by-L clock signal output from counter 78 couples to a clock input of latch 52. In an alternate embodiment (not shown), counters 76 and 78 may be omitted, with their respective outputs being derived from frequency synthesizer 36 and low speed clock 18.

Figure 3:
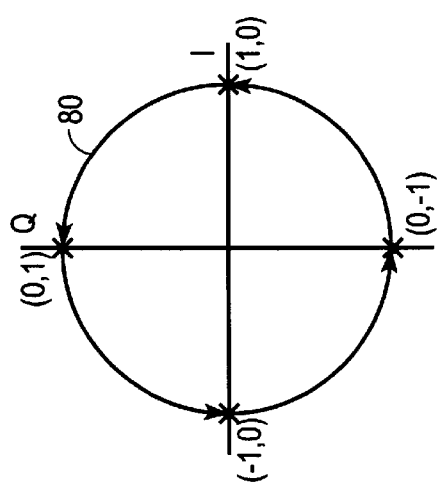
FIG. 3 shows a diagram of a synthesized digital complex exponential oscillation signal.

FIG. 3 shows a diagram of a synthesized digital complex exponential oscillation signal 80. Referring to FIGS. 2 and 3, signal 80 exhibits a frequency one-fourth of the frequency of high speed clock 38. In other words, oscillation signal 80 completes one revolution through the four quadrants of two-dimensional complex space for every four cycles of high speed clock 38. Signal 80 is digitally synthesized by effectively providing four digital samples for each cycle of signal 80, and those four samples are timed to occur when signal 80 crosses the respective in-phase (I) and quadrature (Q) axes. Accordingly, signal 80 exhibits only the digital I,Q values of: 1,0; 0,1; −1,0; and 0, −1. However, since the samples of signal 80 exhibit only the values of −1, 0 and 1, complex multiplication of another complex signal by signal 80 is accomplished in effect by appropriate multiplexing between I and Q samples of the other complex signal with appropriate selective negating thereof. Signal 80 need not be generated per se.

Thus, the multiplication operation used to digitally perform up-conversion is carried out primarily by multiplexer 60 and counter 74 in the embodiment depicted in FIG. 2. I and Q samples of baseband signal 34 and their negations are presented to inputs of multiplexer 60, and multiplexer 60 rotates through a cycle of $I_N$, $Q_N$, $-I_N$ and $-Q_N$ inputs at one-fourth the rate at which D/A converter 70 performs digital-to-analog conversions.

FIG. 4 shows a table 82 which defines a first example of how digital words may be sequentially routed through multiplexing section 54 to D/A converter 70 (FIG. 2). FIG. 5 shows a table 84 which defines a second example of how digital words may be sequenced through multiplexing section 54 to D/A converter 70. The sequencing of digital words through multiplexing section 54 is defined by control section 72. Table 82 applies for a value "L" in which the frequency of high speed clock 38 is forty-eight times the frequency of low speed clock 18, and table 84 applies for a value L in which the frequency of high speed clock 38 is twenty-eight times the frequency of low speed clock 18. The table 82 example illustrates up-sampling by a factor of twelve while the table 84 example illustrates up-sampling by a factor of seven. However, those skilled in the art will appreciate that these two examples are not exhaustive of all possible values of L. In addition, in an alternative embodiment, signal 80 may rotate in a clockwise direction so that the sequence for any single pair of complex digital words would be: I, −Q, −I, Q rather than the: I, Q, −I, −Q sequence depicted in tables 82 and 84.

Referring to FIGS. 2, 4 and 5, the clock count columns in tables 80 and 82 refer to cycles of high speed clock 38. In-phase (I) and quadrature (Q) digital words are routed to D/A converter 70 in complex pairs. In particular, complex pairs of digital words are routed to D/A converter 72 interspersed with complex pairs of negated digital words. Each digital word immediately preceded by a negated digital word is immediately followed by a digital word. Each negated digital word immediately preceded by a digital word is immediately followed by a negated digital word. Accordingly, pairs of digital words are alternated with pairs of negated digital words.

Furthermore, each pair of digital words and pair of corresponding negated digital words are repeatedly routed to D/A converter 70 before other digital word pairs and their corresponding negated digital word pairs are routed to D/A converter 70. Thus, the $I_0$, $Q_0$ digital word pair and their corresponding negations are repeatedly routed to D/A converter 70 before any $I_1$, $Q_1$ digital word pair. Likewise, the $I_1$, $Q_1$ digital word pair and their corresponding negations are repeatedly routed to D/A converter 70 before any $I_2$, $Q_2$ digital word pair, and so on.

As illustrated by the differences between tables 82 and 84, the amount of repetition in presenting digital words and their negations to D/A converter 70 is proportional to the value L or the amount of up-sampling. As L increases, the amount of frequency shifting increases. Accordingly, the amount of frequency shift is expressed by $F_{IF}=L \cdot R_{ls.sample}/4$, where $F_{IF}$ is the amount of frequency shift, L is the factor by which the low speed clock 18 is multiplied to generate high speed clock 38, and $R_{ls.sample}$ is the sample rate as defined by low speed clock 18.

As illustrated by table 84, L need not be chosen to form complete $I_n$, $Q_n$, $-I_n$, $Q_n$ cycles. In other words, L need not be an integral multiple of 16. In the embodiment depicted in FIG. 2, L is desirably a multiple of four, but only because four complex digital word pairs are provided during each cycle of low speed clock 18. In other embodiments different numbers of digital word pairs may be provided per cycle of low speed clock 18, and L would desirably be an integral multiple of such different numbers. Desirably, L is chosen so that a minimum of two D/A conversions are performed for each digital word received at latch 52 during a cycle of low speed clock 18. At such values for L, control section 72 and multiplexing section 54 effect a multiplication of the digital words included in baseband signal 34 by a complex clock signal having an oscillation rate greater than the rate of low speed clock 18, and a usable amount of up-conversion results.

Figure 6:
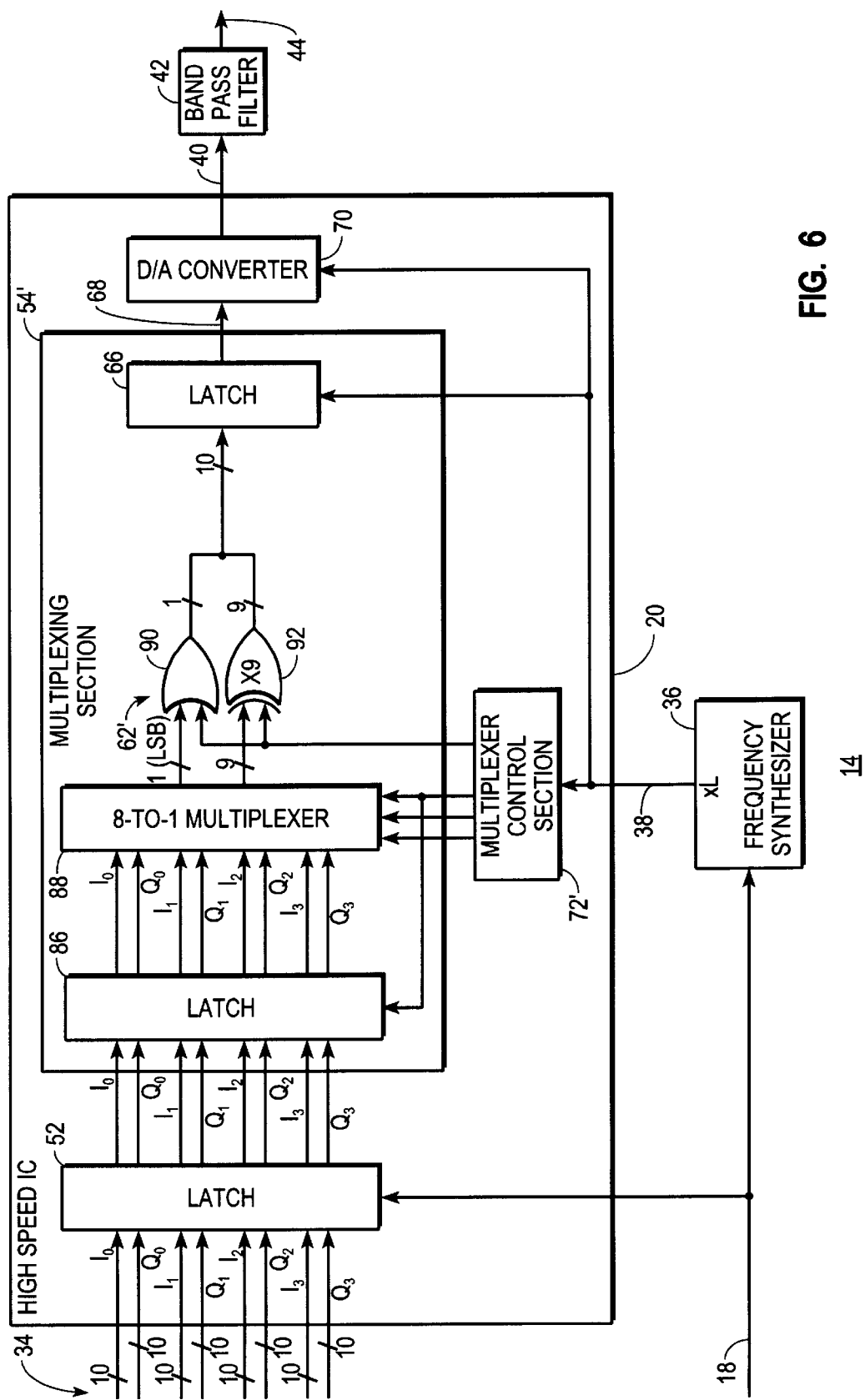
FIG. 6 shows a block diagram of a second embodiment of the digital tuner.

FIG. 6 shows a block diagram of a second embodiment of digital tuner 14. This second embodiment differs from the first embodiment discussed above in connection with FIG. 2 primarily in the configuration of multiplexing section 54 and control section 72. As above, latch 52 is clocked at the low speed clock rate and receives baseband signal 34. In this embodiment, latch 52 conveys baseband signal 34 to a multiplexing section 54' of high speed IC 20, and particularly to inputs of an eighty-bit latch 86. Latch 86 synchronizes baseband signal 34 to the internal timing of high speed IC 20 because latch 52 is clocked by low speed clock 18 in this embodiment. An eighty-bit output from latch 86, arranged as four complex pairs of digital words each of which has ten bits, is routed to inputs of an eight-to-one multiplexer 88.

Multiplexer 88 multiplexes its eight, ten-bit digital word inputs into a single ten-bit output stream. The ten-bit output of multiplexer 88 couples to a selective negation circuit 62'. While desirable for negation circuit 62' and negation circuits 62 and 64 (FIG. 2) to perform precise mathematical negation operations, such precision is not a requirement. Moreover, the performance of a precise mathematical negation operation may suffer from the inclusion of more logic gates and more propagation delays than are needed to implement an approximation of a mathematical negation operation. Accordingly, negation circuit 62' selectively implements an approximation of a mathematical negation operation.

In the embodiment depicted in FIG. 6, the single least significant bit (LSB) from the digital word stream output by multiplexer 88 is routed to first inputs of an OR logic gate 90 while the remaining nine more significant bits are routed to first inputs of nine Exclusive OR logic gates 92. Second inputs of gates 90 and 92 couple together and are driven by a control signal from control section 72'. An approximate negation operation is performed when the control signal exhibits a logic one level, causing the LSB to exhibit a value of one, and all more significant bits to be inverted. When this control signal exhibits a logic zero level, the digital word is unchanged.

Negation circuits 62 and 64 in the embodiment depicted in FIG. 2 may likewise be configured to perform a similar approximation. For example, negation circuits 62 and 64 may each include only inverters for all bits but the LSB, and force the LSB to a logic one level.

Accordingly, negation circuit 62' omits cascading signals between logic gates 90 and 92 which could otherwise accommodate carries between the bits of the digital word. Gates for processing the omitted cascading signals and propagation delay associated therewith are also omitted. In negation circuit 62', the negation approximation will produce a result in which one-half of the negation operations will exhibit a one LSB error, while one-half of the negation operations will exhibit no error. Accordingly, when averaged over all digital-to-analog conversions of negated and non-negated digital words, a ¼ LSB error is introduced, which adds to the ½ LSB quantization error characteristic of D/A converter 70. As discussed below, the resulting ¾ LSB quantization error is reduced by band pass filter 42.

The ten-bit output of selective negation circuit 62' couples to an input of latch 66, which provides digital IF signal stream 68 from multiplexing section 54' to D/A converter 70.

Multiplexer control section 72' is driven by high speed clock 38 and provides outputs which couple to selection inputs of multiplexer 88. One of these selection inputs may be used to generate a signal which clocks latch 86. Multiplexer control section 72' is configured in a manner known to those skilled in the art to produce a desired routing sequence of digital words, as discussed above in connection with FIGS. 4–5. The desired routing sequence results from routing selected digital words through multiplexer 88 and selectively inverting the digital words by manipulation of the control signal supplied to selective negation circuit 62'.

Figure 7:
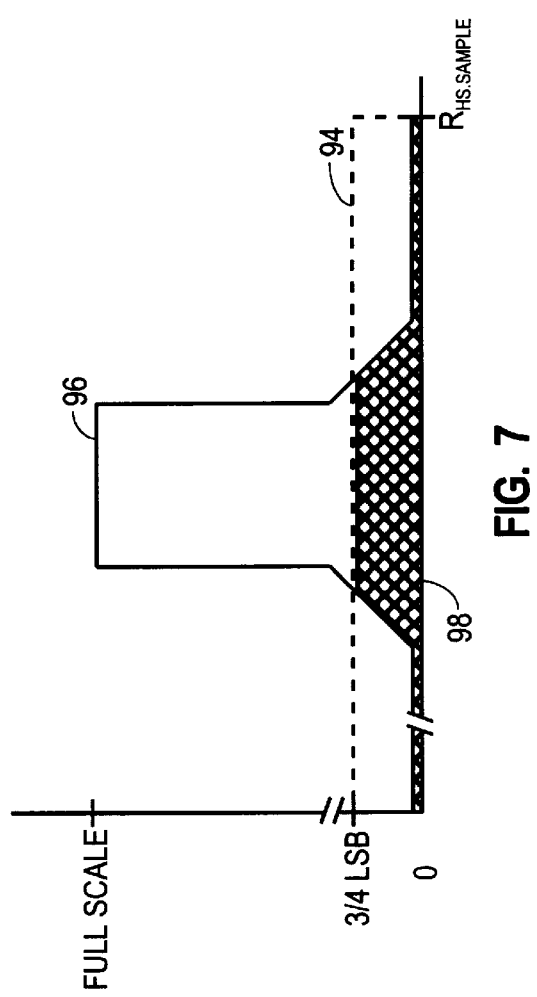
FIG. 7 shows a spectral diagram illustrating a reduction in digital-to-analog (D/A) converter quantization error through filtering.

FIG. 7 shows a spectral diagram illustrating a reduction in digital-to-analog (D/A) converter quantization error through filtering in band pass filter 42. Referring to FIGS. 2, 6 and 7, D/A converter 70 is clocked by high speed clock 38 ($R_{hs.sample}$). This causes the quantization error to be distributed roughly equally throughout the entire spectrum up to the high speed clock frequency, as indicated by the region beneath dotted line 94 in FIG. 7. The quantization error depicted by line 94 is found in broadband analog signal 40.

The relatively high conversion rate is typically much greater than the baud rate, as expressed by: $R_{baud}= K \cdot R_{hs.sample}/(L \cdot 256)$. The spectral content of the digital communication signal is confined to a passband having a width approximately equal to the baud rate. Accordingly, the small passband exhibited by filter 42 attenuates the majority of quantization error along with other spectral components which reside outside the desired passband. The transfer characteristic of band pass filter 42 is represented by curve 96 in FIG. 7, and the resulting quantization error represented by shaded region 98. Only the quantization error represented by shaded region 98 is found in IF analog signal 44. On average, the quantization error has been reduced throughout the sampling frequency band of D/A converter 70, and an effective 2–3 bits of D/A converter resolution has been added to the communication signal waveform. This effective 2–3 bits is achieved without increasing the processing resources of digital tuner 14 to handle data words of greater precision.

In summary, the present invention provides an improved digital tuner. This improved digital tuner is suitable for digitally up-converting a complex, baseband digital communication signal characterized by a plurality of relatively low speed data streams. Errors common in tuners which use analog devices for up-conversion functions are avoided. The digital tuner digitally performs combining and mixing functions using a simple architecture which requires few gates and is suitable for monolithic manufacturing using high speed semiconductor processes. This simple architecture produces a reliable, reduced-error, low cost digital tuner that generates an IF signal in the desirable range of 150–600 MHz.

Although the preferred embodiments of the present invention have been illustrated and described in detail, it will be readily apparent to those skilled in the art that various modifications and equivalents may be made therein without departing from the spirit of the invention or from the scope of the appended claims. For example, multiple low speed IC's may provide parallel inputs for a single digital tuner as described herein.

What is claimed is:

1. A digital tuner comprising:
   a latch for receiving a plurality of digital words during each of succession of temporal intervals, wherein said digital words received over said succession of temporal intervals define a complex baseband digital communication signal modulated to convey data at a predetermined baud;
   a multiplexing section having an input coupled to said latch to receive said plurality of digital words at a predetermined rate and having an output, said output providing said digital words and said digital words negated;
   a digital-to-analog (D/A) converter having an input coupled to said output of said multiplexing section; and
   a control section coupled to said multiplexing section so that, during said intervals, said plurality of digital words is routed through said multiplexing section to said D/A converter interspersed with said negated digital words so as to effect a multiplication of said digital words by a complex clock signal having an oscillation rate greater than said predetermined rate, said multiplication effected by said control and multiplexing sections up-converting said complex baseband digital communication signal to a frequency band in the range of 150 MHz to 600 MHz.

2. A digital tuner comprising:
   a latch for receiving a plurality of digital words during each of succession of temporal intervals;
   a multiplexing section having an input coupled to said latch to receive said plurality of digital words at a predetermined rate and having an output, said output providing said digital words and said digital words negated;
   a digital-to-analog (D/A) converter having an input coupled to said output of said multiplexing section, wherein said D/A converter performs digital-to-analog conversions of said digital words and said negated digital words at a sampling frequency;
   a control section coupled to said multiplexing section so that, during said intervals, said plurality of digital words is routed through said multiplexing section to said D/A converter interspersed with said negated digital words so as to effect a multiplication of said digital words by a complex clock signal having an oscillation rate greater than said predetermined rate; and
   a band-pass filter configured to have a passband less than one-half of said sampling frequency.

3. A method for integrally tuning and analog-converting a complex digital baseband signal, said method comprising:
   receiving a plurality of digital words substantially in parallel at a parallel-word frequency, wherein each of said digital words conveys real and imaginary components of said complex baseband signal;

negating said real and imaginary components to generate negated real and negated imaginary components, respectively;

routing said real, imaginary, negated real and negated imaginary components to a digital-to-analog (D/A) converter so that said real and imaginary components are interspersed with said negated real and negated imaginary components;

converting said components in said D/A converter at a conversion frequency to generate a broadband analog signal, said conversion frequency being greater than twice said parallel-word frequency; and filtering said broadband analog signal in a filter having a passband less than one-half said conversion frequency;

wherein said routing operation routes said real, imaginary, negated real and negated imaginary components to said D/A converter so as to effect a multiplication of said baseband signal by a complex clock signal having a frequency greater than said parallel-word frequency.

4. A method as claimed in claim 3 wherein said routing operation is configured so that:

pairs of said real and imaginary components are sequentially routed to said D/A converter;

pairs of said negated real and negated imaginary components are sequentially routed to said D/A converter; and said real and imaginary component pairs are alternately routed with said negated real and negated imaginary component pairs.

5. A method as claimed in claim 3 wherein said converting operation performs at least two digital-to-analog conversions for each digital word received during said receiving operation.

6. A method for integrally tuning and analog-converting a complex digital baseband signal, said method comprising:

receiving a plurality of digital words substantially in parallel at a parallel-word frequency, wherein each of said digital words conveys real and imaginary components of said complex baseband signal;

negating said real and imaginary components to generate negated real and negated imaginary components, respectively;

routing said real, imaginary, negated real and negated imaginary components to a digital-to-analog (D/A) converter so that said real and imaginary components are interspersed with said negated real and negated imaginary components;

converting said components in said D/A converter at a conversion frequency to generate a broadband analog signal, said conversion frequency being greater than twice said parallel-word frequency; and filtering said broadband analog signal in a filter having a passband less than one-half said conversion frequency;

wherein said routing and converting operations are configured so that a first pair of said real and imaginary components are repetitively converted prior to converting a second pair of said real and imaginary components.

7. A method as claimed in claim 6 wherein a first pair of said negated real and negated imaginary components are repetitively converted interspersed with said first pair of said real and imaginary components prior to converting a second pair of said negated real and negated imaginary components.

8. In a digital communications modulator, a tuning and analog-conversion apparatus for a data-modulated, complex, digital baseband signal which conveys data at a predetermined baud, said apparatus comprising:

a latch for receiving at least two complex pairs of digital words during each of a succession of temporal intervals;

a multiplexing section having an input coupled to said latch to receive said digital words and having an output, said output sequentially providing said digital words interspersed with said digital words negated;

a control section coupled to said multiplexing section so that, during said intervals, said digital words are repetitively provided at said multiplexing section output and interspersed with said negated digital words to effect a multiplication of said complex digital baseband signal by a complex clock signal;

a digital-to-analog (D/A) converter having an input coupled to said output of said multiplexing section and configured to perform digital-to-analog conversions at a conversion frequency four times the frequency of said complex clock signal; and a band pass filter coupled to said D/A converter, said band pass filter having a passband less than one-half of said conversion frequency and centered at a frequency greater than one-half said baud.

9. An apparatus as claimed in claim 8 wherein said latch, multiplexing section, control section and D/A converter are formed on a common semiconductor substrate.

* * * * *